May 17, 1932. J. R. COLE 1,858,882
STUFFING BOX AND PACKING THEREFOR
Filed April 16, 1930
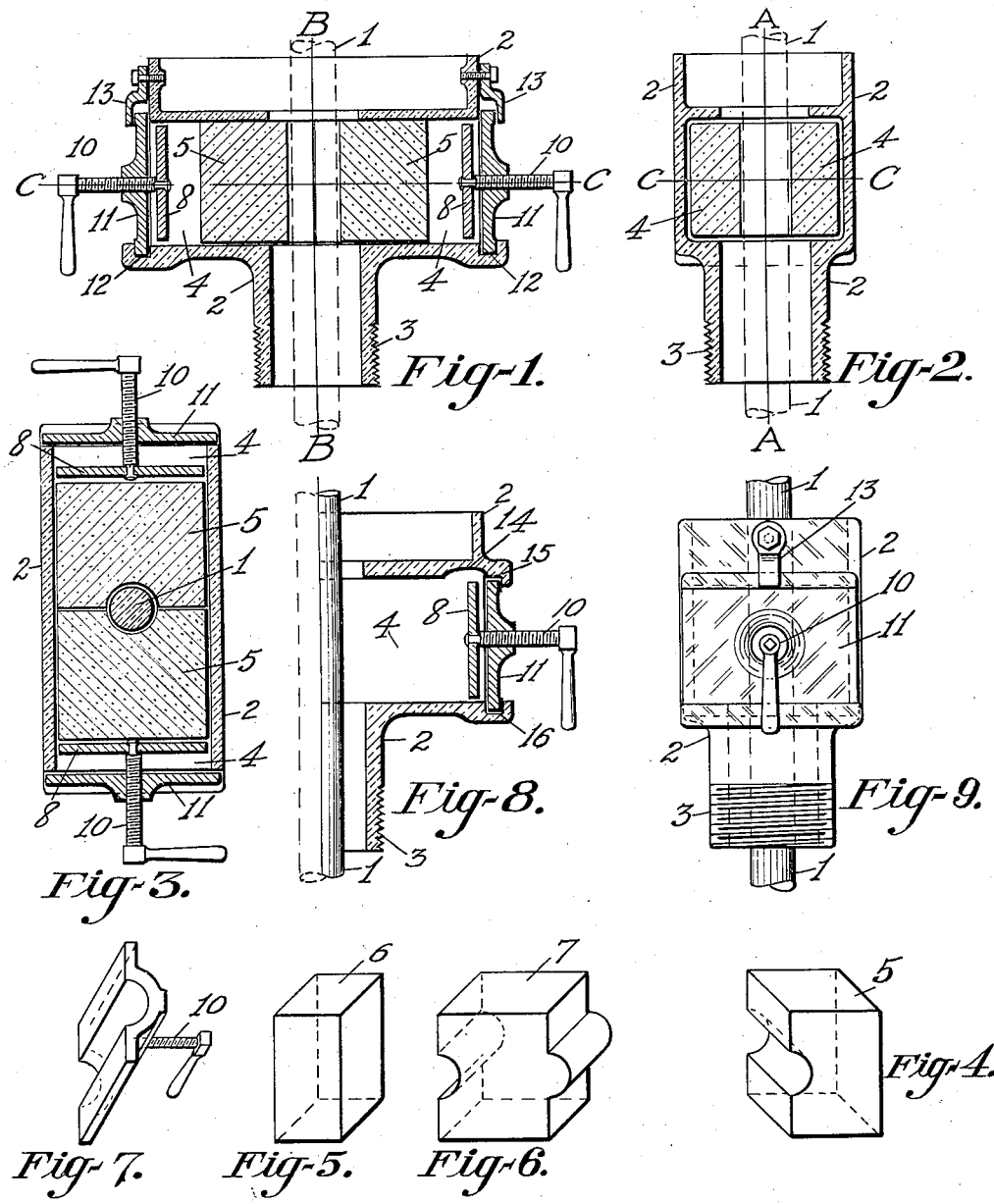
INVENTOR Patented May 17, 1932

1,858,882

UNITED STATES PATENT OFFICE

JAMES R. COLE, OF TULSA COUNTY, OKLAHOMA

STUFFING-BOX AND PACKING THEREFOR

Application filed April 16, 1930. Serial No. 444,697.

My invention relates to stuffing boxes, primarily for oil wells but capable of using in other connections, and has for its object to provide a box which can be very easily opened to replace the rubbers or packing material, and very easily closed, and one which permits all of the rubber or packing material to be used. The convenience mentioned is particularly beneficial on oil wells where many times a wrench to open and close a box in order to replace rubbers, is not handy. My invention also relates to providing means of satisfactorily packing such a box in the manner stated, that is in providing a packing element in a form so that it may all be used up in the box.

With the above and other objects in view which will appear as the description proceeds, my invention consists in the novel features hereinafter set forth in detail, illustrated in the accompanying drawings, and more particularly pointed out in the appended claims.

Referring to the drawings, in which numerals of like character designate similar parts thruout the several views:

Fig. 1 is a cross sectional view in side elevation, on line A—A Fig. 2, of the polished rod and box with the rubbers or packing in place.

Fig. 2 is a cross sectional view in end elevation, on line B—B Fig. 1, of the polished rod and stuffing box frame, showing the packing chamber.

Fig. 3 is a cross sectional view in top elevation, on line C—C Figs. 1 and 2.

Fig. 4 is a view of a rubber or packing element having a groove to take the polished rod.

Fig. 5 is a view of a rubber without the groove and designed to use following the rubber shown in Fig. 4.

Fig. 6 is a rubber in modified form having the polished rod groove and also having the opposite end to the polished rod groove of the contour of said groove so as to dovetail into it when following a rubber into the box.

Fig. 7 is a follower in modified form with its face made to conform to the rear end of the modified form of rubber shown in Fig. 6.

Fig. 8 is a cross sectional side elevation of a modified form of locking arrangement for the thrust plate or removable breech block 11 of Fig. 1.

Fig. 9 is an end view of the stuffing box shown in Fig. 1.

In the drawings, 1 represents the polished rod or other reciprocating element, 2 the stuffing box frame or body portion which is threaded as at 3 to attach to the tubing or pipe or chamber containing the fluid which it is desired to pack off, 4 the packing chamber which together with its passage way which is a continuation of the chamber, runs clear thru the box from one end to the other and open on both ends, 5 the rubbers or packing elements which are inserted in the open end of the packing chamber 4 thru the passage way aforesaid, 6 the straight sided replacement rubbers designed to follow the rubber 5 as the latter wears, 7 a modified type of rubber or packing element designed so that one may follow the other into the box and this type would replace both rubbers 5 and 6, 8 the follower which contacts with the rubber and forces it into place against the polished rod by means of a screw 10 threaded into a thrust plate or removable breech block 11 held on the end of the stuffing box by a locking groove 12 on the box, and by a latch 13 on the box. The arrangement permits the thrust plate to be inserted into the groove 12 and then positioned against the end of the box, and the latch, which is pivoted so that it may be turned, is then brought over the thrust plate. The follower 8, when pulled back close to the thrust plate will clear the chamber or passage way walls. When the follower is screwed against the rubber 5, the thrust plate bears against the shoulder or flange of the groove 12 and against the latch 13.

In Fig. 8 is shown another locking device for locking the thrust plate 11 against the ends of the stuffing box chamber, and in this form the latch is dispensed with and opposite the groove which corresponds to groove 12 in Fig. 1 is a deeper groove or recess 14 ending in a shoulder 15. In using this form, the follower is screwed back against the thrust plate or nearly so, and the thrust plate then inserted in groove 14 which is large enough to hold the lip of the thrust plate thus inserted therein and deep enough to then permit the other end or opposite lip of the thrust plate to be inserted in the groove corresponding to the groove 12 in Fig. 1, whereupon the end of the thrust plate in groove 14 is brought back to the shoulder 15. When the follower is screwed up against the rubber or packing element preceding it into the packing chamber, the pressure holds the thrust plate against the shoulder or flange 15 of the recess 14 and against the shoulder or flange 16 of the recess corresponding to the groove 12 in Fig. 1.

It will thus be seen that no tools are necessary to open the box and insert the rubbers or packing element, and that when the packing element wears no part thereof is removed and thrown away but another element is inserted thru the breech of the packing chamber and its passage way and pressed into the packing chamber and compressed therein.

Having thus fully disclosed by invention, what I claim and desire to secure by Letters Patent is:

1. A packing element adapted for use in a stuffing box wherein a plurality of packing elements are used on opposite sides of a reciprocating element passed thru said stuffing box, front and rear surfaces on said packing element, and with said front and rear surfaces correspondingly contoured to conform to each other to the effect that one of such packing elements may follow behind another of such packing elements into a stuffing box and in its turn engage the reciprocating element aforesaid without an intervening space existing between the two packing elements such as would leave the perimeter of the packing chamber of said stuffing box exposed to the passage of fluid between the two aforesaid packing elements.

2. A stuffing box adapted to receive a polished rod passed thru its packing chamber, and having a packing chamber open at opposite sides of the polished rod and with said opening arranged so that a packing element may be inserted therethru on either side of said polished rod; means of compressing said packing element against said polished rod and against the walls of said packing chamber one of which means is a breech block adapted to be held in position on said stuffing box by the pressure exerted in compressing said packing element within said stuffing box.

3. A stuffing box as claimed in claim 2, with breech block as therein claimed, and which said breech block is adapted to be released from said stuffing box by removing the pressure on said packing element and by running back one of the means of compressing said packing element.

4. A stuffing box adapted to receive a polished rod passed thru its packing chamber and having a packing chamber open at opposite sides of the polished rod and with said openings arranged so that a packing element may be inserted therethru on either side of said polished rod; means of compressing said packing element against said polished rod and against the walls of said packing chamber one of which means is a breech block; and means provided whereby said breech block may be both positioned and held on said box and removed therefrom without any operation other than by operating the said means of compressing said packing element.

5. A packing element as claimed in claim 1, and with the front face of said packing element having therein a groove adapted to partially receive the polished rod aforesaid, and with the rear face of said packing element having thereon a corresponding ridge.

6. A stuffing box adapted to receive a reciprocating element passed thru its packing chamber; a packing chamber as aforesaid in said stuffing box and positioned laterally of the position assumed by said polished rod when passed thru said stuffing box; an opening in the end of said packing chamber adapted to receive a packing element passed thru said opening and into said packing chamber; a passageway communicating with said opening and leading to the exterior of said stuffing box and so adapted and arranged that a packing element may be inserted therethru into said packing chamber; a recess in said passageway adapted to receive a portion of the hereinafter mentioned removable breech block; means of compressing the aforesaid packing element against said reciprocating element when the same is in said stuffing box and of compressing said packing element against the walls of said packing chamber, one of which means is a removable breech block adapted to be held in operating position on said stuffing box by the pressure exerted in compressing said packing element within said packing chamber.

In testimony whereof I affix my signature.

JAMES R. COLE.